3,344,052
METHOD OF PRODUCING AMMONIA INCLUDING CONTACTING AN ELECTROSTATICALLY CHARGED CATALYST WITH NITROGEN AND HYDROGEN
George C. Yeh, Willistown Township, Chester County, Pa. (Sonedley Drive, R.D. 1, Newtown Square, Pa. 19073)
No Drawing. Filed Nov. 23, 1964, Ser. No. 413,312
6 Claims. (Cl. 204—177)

This invention relates to the synthesis of ammonia from hydrogen and nitrogen and is particularly concerned with the synthesis of ammonia from hydrogen and nitrogen with improved conversion efficiencies which are caused by various electrical activating techniques applied to the reacting system.

It is well known that due to the low rates of the synthesis of ammonia from hydrogen and nitrogen at moderate temperatures and pressures, the industrial synthesis processes of ammonia are usually carried at relatively high temperatures (400° to 600° C.) and pressures (100 atm. to 500 atm.) in order to assure higher conversion efficiencies per pass. In the industry, the yield of ammonia is usually improved by costly recycling of the reactants mixture. In the past, great efforts have been made by many workers in the field to search for catalysts having greater activities needed for higher conversion efficiencies and improved structural strength suitable for the severe conditions employed in the synthesis process. However, the roles played by various catalysts in the ammonia synthesis are quite complicated, and evident interpretation to these roles is often not available. The conversion efficiency of a synthesis process of ammonia does not entirely depend on the catalytic activity and structural properties. A catalyst having a greater affinity for the reactants, i.e. nitrogen and hydrogen, does not necessarily give a higher conversion efficiency per pass. The mechanisms and the activation energy needed for each step of the mechanisms will always control the overall rate of the process; therefore, the conversion efficiency of ammonia synthesis may be improved when these basic factors are taken into consideration.

It is an object of the present invention to provide methods of synthesizing ammonia from nitrogen and hydrogen with improved conversion efficiencies caused by various electrical activating techniques which require relatively insignificant amount of energy to be introduced to the reacting system. The electrical activating techniques include static electrical charges (either positive or negative, or both) and an electric field, which are effectively used in modifying the electronic properties of the reacting system and influencing the mechanisms, and rates of the elementary reactions involved in the synthesis process, in order that the process may be enhanced.

Another object of this invention is to provide various methods of applying said electrical activating techniques to analyze and control the rates and mechanisms of the ammonia synthesis processes from hydrogen and nitrogen. The activating techniques developed in the present invention may be applied to most of the industrial ammonia synthesis processes in order to increase the production capacity and to improve the control of the process and the quality of the products. This, in turn will lower the cost of the production of ammonia.

The only published works that are related to the present invention are probably those on the effects of an electric field by:

(a) Bluh, O. (Z. Physik, 107, 369 (1937)) on the adsorption of carbon dioxide and sulfur dioxide on aluminum.

(b) Stadnik, P. M. and E. Yu Sekeresh (Kinetika i Kataliz 5, (3), 430 (1964)) on the activity of ZnO catalyst used in the oxidation of methanol.

Nowhere in the literature is there any report on the effects of static electric charges on gaseous reaction systems.

As well-known to many workers in the field, nearly every theory of catalysis and chemisorption has been based upon the assumption of either a resultant electric potential existing at the surface of the adsorbent due to the electrons of the outer shell or the interaction of the adsorbed molecules with these electrons or both.

I have studied the effects of high-voltage static charges (positive or negative, or both) and a static electric field upon many chemical processes including homogeneous reactions in gas and liquid phases and heterogeneous reactions in gas-solid and in liquid-solid systems. I have found that in many gas-solid phase heterogeneous reactions, by influencing either the surface potential of an adsorbent or the availability of electrons for interaction with the adsorbate, the rate or extent of adsorption of a gas could be influenced or controlled. In general, if a gas molecule were absorbed by transferring electrons to the surface, the application of a positive static electrical charge to the surface of the adsorbent would improve the rate of transfer of electrons and the capacity to accept electrons. Therefore, the activation energy required for the adsorption is lowered, but because of this, the activation energy required for the desorption is usually increased, thus increasing the rate and extent of adsorption. Conversely, the application of a negative static electrical charge to the surface could be expected to decrease the rate and extent of said adsorption. If a gas molecule were adsorbed by receiving electrons from the surface, then the reversed effects may be expected from the application of the static electrical charges. I have found also that it is possible that the application of proper electrical activating techniques which require only insignificant amounts of energy may eliminate the need of catalysts in certain reactions.

Among many chemical processes studied by myself, the synthesis of ammonia was the first investigated; and the above described general rules have been observed in the ammonia synthesis experiments carried out. This invention is based on the results of these experimental studies.

According to the present invention there are a number of preferable methods of introducing insignificant amounts of electrical energy needed to achieve the effects described above by means of high-voltage static electrical charges (either positive or negative, or both) or an electrical field to the reacting system of

in the presence of catalyst. Examples are:

(1) One of the two reactants, either $N_2$ or $H_2$ is electrically charged or ionized positively while the other reactant is separately charged or ionized negatively prior to entering the catalyst bed. In this case, the catalyst bed is not electrically charged.

(2) Only one of the two reactants is electrically charged or ionized, either positively or negatively prior to entering the catalyst bed while said bed is also electrically charged but in the opposite polarity. For example, if one of the reactants were positively charged, then the catalyst bed would be negatively charged.

(3) The mixture of both reactants is electrically charged or ionized, either positively or negatively prior to entering the catalyst bed while said bed is also electrically charged but in the opposite polarity.

(4) The catalyst bed is electrically charged either positively or negatively, but the reactants are not electrically charged or ionized prior to entering said catalyst bed.

(But, as a result part of the reactants may be charged or ionized within said catalyst bed.)

(5) The entire or part of the reacting system may be subjected to a static electric field developed between two electrodes situated within the reactor.

It should be mentioned that in this invention only a static electric charge or an electric field may be applied to the catalyst bed, and no arc discharge should be applied to said catalyst bed. However, an arc discharge may also be used in charging or ionizing the reactant gases outside the catalyst bed in order to develop the same effects which a static electrical charge or an electrical field may have upon said reactant gas as described above. Also, an activation technique combining a static electric charge applied to the catalyst bed and an arc discharge applied to the reactants will be considered within the scope of this invention. (An arc discharge is not considered to be a preferable form of activating the reactants in this invention.)

The procedure involved in applying the above methods is relatively simple though care must be exercised in electrically insulating the reactor and in designing the electrodes for the maximum charging or ionizing effect on the gas reactants.

A preferable design of electrodes to be used in charging or ionizing gas reactants in this invention has the shape of a long saw-blade which is then rolled to form the shape of a whirlpool with annular spacing to fit into one end of a tubular reactor, facing the catalyst bed. The numerous sharp teeth sticking out one or both sides of said blade provide the maximum potential gradient needed for the highest charging or ionizing effect on the gas passing, and the annular spacing of said electrode functions perfectly as distributor for the gas flowing through, thus contributing to better charging or ionizing effect.

To apply a static electrical charge to the catalyst bed, a wire is sealed into the reactor and contacting the catalyst.

Having all the necessary electrodes situated properly in the reactor next step would be turning on a static electrical charge of the desired polarity and voltage to the desired electrode, or generating a static electric field (or an electric arc discharge if desired) between the two electrodes.

The following examples will serve to illustrate the invention:

*Example 1*

Prior to the synthesis experiment, the effects of said activating techniques upon the adsorption of hydrogen and of nitrogen on the promoted iron catalyst were investigated. The experimental procedure followed is similar to the standard procedure employed in gas adsorption experiments for the determination of adsorption isotherms. The catalyst was evacuated and degassed for two hours at 850° F. under less than 0.2 cm. of mercury pressure and then brought to 360°±1° C. and held for an hour before each experimental run, in order to assure reproducibility of results. Next, a measured volume of hydrogen was admitted to the catalyst bed contained in a Pyrex flask. From the instant of admission, a series of time and pressure readings were taken. The data were used to obtain curves of rate as a function of amount adsorbed. High voltage DC charge was applied to the catalyst by means of a wire sealed into said flask and contacting said catalyst bed. Temperature was controlled at 360°±1° C. and pressure at 1 atm. initial pressure. The same catalyst was used repeatedly for various voltages. The measurement of the volume of hydrogen put into the system was accomplished by using a gas burette, and from this the number of moles was calculated. For each run, the pressure versus time curve was extrapolated to zero time and a value for the volume of said flask and connecting tubing was accurately determined. This enables the pressure readings to be converted into moles and, using the calculated value of the total number of moles transferred from said burette to the system, the amount adsorbed in moles was determined as a function of time. Differentiation of this permitted the construction of curves of rate of adsorption versus time and from these curves, plots of rates versus amount adsorbed were obtained. Twenty-six experimental runs were made, two each for the following conditions:

Electrically neutral—no voltage applied

Positive static charge—300, 1,200, 4,500, 7,400, 15,300, and 22,500 volts

Negative static charge—450, 1,500, 6,700, 12,100, 20,400, and 30,000 volts.

(In each run, the current supplied was always less than 3.0 milliamperes.) The results may be briefly summarized as follows:

(1) The reproducibility of results is always within ±3% error.

(2) The equilibrium amount of adsorption of hydrogen on the promoted iron catalyst used was increased as much as 10% (±3% error is included) with the application of negative static charge between −1,500 and −6,700 volts. Further increase in negative voltage did not increase said effect to any noticeable extents.

(3) Neither rate nor extent of the adsorption of hydrogen were affected by positive static charge between 0 and +30,000 volts to any appreciable extents.

*Example 2*

Following the same procedure used in Example 1, the adsorption of nitrogen on the same catalyst under the influence of a static electric charge was investigated. Thirty-eight experimental runs were carried out under 1 atm. initial pressure and constant volume at 400°±1° C., using the same apparatus. Two runs for each of the following conditions were made:

Electrically neutral—no voltage applied.

Positive static charge—300, 1,200, 2,500, 4,500, 7,400, 15,300 and 22,500 volts.

Negative static charge—450, 1,500, 2,500, 4,500, 6,700, 12,100, 15,300, 17,800, 20,400, 25,100, 30,000 volts.

(In each run, the current supplied was always less than 3.0 milliamperes.) The results are summarized as follows:

(1) The rate of adsorption of nitrogen on the promoted iron catalyst used was increased as much as 27% (including ±3% experimental error) when a static negative charge between −1,500 and −12,100 volts was applied to the catalyst bed. The effect was found most pronounced with the static voltage between −6,700 and −12,100 volts, beyond which no appreciable increase in said effect was observed. The effect decreased slightly at the voltages of −25,100 volts and +30,000 volts, though this small change may be due to some unknown experimental errors introduced.

(2) Again, no noticeable effect upon the rate of adsorption was observed when a positive charge was applied to the catalyst bed. But, the equilibrium amount of the adsorption of nitrogen on the catalyst was decreased as much as 15% with +4,500 volts.

It is well known to many workers in the field that the adsorption of nitrogen on the catalyst is often the rate-controlling step of the catalytic ammonia synthesis processes since it requires the highest energy of activation. The above results appear to be very encouraging, and the synthesis process was then investigated under various conditions using various methods of the activating technique as described above.

*Example 3*

A mixture of hydrogen and nitrogen with 3:1 mole ratio is continuously fed into and the product withdrawn from a Vycor-glass flow reactor, 2 in. I.D., which is heated by an external electric heater to maintain a constant temperature of 400°±1° C. The same promoted iron catalyst was packed in a bed whose depth can be varied within said reactor. All the experimental runs were carried out with the space velocity of 500 cm.$^3$ (NTP) per cm.$^3$ catalyst per minute, in single pass. The amount of ammonia formed in the products was determined by the acid titration and chromatography. The data were then used to calculate the conversion efficiency per pass, which is equal to the ratio of number of moles of ammonia formed to the theoretical number of moles of ammonia at the equilibrium state. More than fifty experimental runs have been made under 1 atm. pressure using various activating methods. The results of most representative twenty-two runs are compared in the following table.

RESULTS

| Run No. | Static Electric Charges Applied | Conversion Efficiency $\left(\dfrac{NH_3\ formed}{NH_3\ equil}\right)$ | Increase in Conversion Efficiency (Compare with Run 31) |
|---|---|---|---|
| | Continuous D.C. negative: | | |
| 32 | −450 volts | 0.326 | 0.065 |
| 33 | −2,500 volts | 0.505 | 0.244 |
| 34 | −4,300 volts | 0.621 | 0.360 |
| 35 | −6,500 volts | 0.647 | 0.386 |
| 36 | −15,000 volts | 0.473 | 0.212 |
| 37 | −25,700 volts | 0.411 | 0.150 |
| | Continuous D.C. positive: | | |
| 48 | +1,200 volts | 0.269 | 0.08 |
| 49 | +5,400 volts | 0.238 | −0.023 |
| 50 | +11,400 volts | 0.229 | −0.032 |
| 51 | +26,300 volts | 0.241 | −0.020 |
| | Intermittent D.C., negative: [1] | | |
| 62 | −25,500 volts | 0.485 | 0.224 |
| 63 | −6,500 volts | 0.493 | 0.232 |
| | Alternate D.C.: [2] | | |
| 74 | −25,500/+5,300 | 0.474 | 0.213 |
| 75 | −15,100/+5,300 | 0.503 | 0.242 |
| 76 | −6,500/+5,300 | 0.432 | 0.171 |
| | Continuous A.C., 60 cycle: | | |
| 87 | 2,500 | 0.386 | 0.125 |
| 88 | 7,700 | 0.490 | 0.229000 |
| 89 | 12,500 | 0.508 | 0.247 |
| 90 | 18,100 | 0.510 | 0.249 |
| 91 | 22,300 | 0.503 | 0.242000 |
| 31 | Electrically neutral | 0.261 | |
| 31a | do | 0.259 | |

[1] 5 minutes on and 1 minute off.
[2] 5 minutes negative charge and 1 minute positive charge.

(In each run, the current supplied was always less than 3.0 milliamperes.)

It should be mentioned that in runs 35, 36 and 37 it was found that when the negative charge was turned off, there was a slight temporary increase in rate of NH$_3$ formation. This temporary increase in rate was found more appreciable when a higher negative voltage was applied. This finding led to the experiments of runs 62 and 63, and also runs 74 through 76.

It may be summarized from the results of Example 3 that:

(1) The conversion efficiency was increased as much as 38.6% by static negative charge; and the greater effect developed with around −6,500 volts for the catalyst used. Further increase in negative voltage caused decrease of this effect.

(2) Little effect was caused by positive charge between +1,200 volts and +26,300 volts.

(3) The intermittent negative charge with −25,500 volts increased the conversion efficiency slightly more than continuous negative charge of the same voltage.

(4) The alternate DC charges developed about the same effect as the intermittant negative charge upon the conversion efficiency.

(5) The effect of continuous AC static charge (60 cycle) upon the conversion efficiency was found to be very similar to that of the alternate DC charges applied.

The results of experimental runs 36, 37 and 62 through 81 appear to suggest that the bonds or links established between the catalyst surface and the adsorbed nitrogen atoms must not be too strong since the activation energies needed for the steps following, i.e., partial and complete hydrogenation of the nitrogen linked to the catalyst must be limited in order that the overall reaction may proceed smoothly. It is obvious from Example 3 that this objective may be achieved by applying one of the four activating techniques:

(1) continuous negative charge at voltages not too high, (2) intermittant negative charge at relatively higher voltages, (3) alternate DC charges also at relatively higher voltages, and (4) continuous AC charge, also at relatively higher voltages.

It is also obvious that the attraction force and the links between the catalyst and the nitrogen atoms adsorbed must depend also on the activity or other properties of said catalyst. Therefore, the proper voltage to be applied in each activating technique must be experimentally determined, for the specific catalyst. It appears that the greater the catalyst activity the smaller the negative voltage would be required for the same extent of the effect described above.

*Example 4*

Hydrogen and nitrogen were fed separately into the same reactor with the mole ratio of 3:1. In this experiment, nitrogen was fed into one end of the reactor, flowing through said specially designed electrode which also serves as the distributor, and is ionized positively with static charge of +3,300 volts. Hydrogen was fed from the same end of said reactor by means of a tube extended to the very front of the catalyst bed, where it is mixed with said ionized nitrogen just before entering said catalyst bed. The catalyst bed is continuously charged with −3,100 volts. The total static potential developed across the distance of 6 in. between the two electrodes is 6,400 volts. Since no appreciable current is flowing, an electric field is also established in the region, and there might have been some additional effects upon the reacting system. The temperature, pressure, space velocity and catalyst used are the same as Example 3. The products were withdrawn from the other end of the reactor, i.e. the bottom side of said catalyst bed; and the conversion efficiency was found to be 0.605, which is comparable to the results of run 34 in Example 3.

It is obvious from the above example illustration that the conversion efficiency of catalytic synthesis of ammonia can be increased appreciably if one controls the rates and extents of the elementary reactions involved by applying various electrical activating techniques, using DC or AC static electric charges or an electric field, or both, as illustrated in the above examples. The current supplied is relatively insignificant though the voltages applied are relatively high in most cases. The optimum voltage or field strength will depend on the activity and other properties of the catalyst employed, and must be experimentally determined for individual catalyst, as described above.

It will be understood that this invention includes all the catalytic synthesis processes of ammonia from nitrogen and hydrogen using various catalysts and conditions, as long as one or more of the electrical activating techniques are applied to the reacting system in order to enhance or control the process.

Having thus described my invention of what I claim as new and desire to secure by Letters Patent is:

1. In a method of synthesizing ammonia from a gaseous stream predominantly of nitrogen and hydrogen including heating a mixture of said gases and bringing said stream into intimate contact with a bed of catalyst for effecting interaction between said nitrogen and hydrogen to produce ammonia, the improvement wherein said catalyst is biased with a negative electric potential sufficient to provide an electrostatic charge but insufficient to cause an electrical discharge.

2. The method of claim 1 wherein at least one of said gases is subjected to an electrostatic field prior to contact with said catalyst bed.

3. The method of claim 1 wherein the negative potential is applied with a continuous direct current.

4. The method of claim 1 wherein the negative potential is applied with an intermittent direct current.

5. The method of claim 1 wherein the negative potential is applied with an alternating current including application of an intermittent positive potential.

6. The method of claim 5 wherein the negative potential is higher than the positive potential.

References Cited

UNITED STATES PATENTS

| 1,313,314 | 8/1919 | Metzger | 204—178 |
| 1,313,315 | 8/1919 | Metzger | 204—178 |

FOREIGN PATENTS

| 28,173 | 8/1921 | Denmark. |

JOHN H. MACK, *Primary Examiner.*
R. MIHALEK, *Assistant Examiner.*